United States Patent
Richters et al.

[11] Patent Number: 5,738,405
[45] Date of Patent: Apr. 14, 1998

[54] OFF-ROAD VEHICLE HAVING A TWO-PART ROOF STRUCTURE

[75] Inventors: Volker Richters, Sindelfingen; Erich Rühringer, Magstadt; Wolfgang Müller, Sindelfingen, all of Germany

[73] Assignee: Mercedes-Benz AG, Stuttgart, Germany

[21] Appl. No.: 388,027

[22] Filed: Feb. 14, 1995

[30] Foreign Application Priority Data

Feb. 14, 1994 [DE] Germany ................ 44 04 619.7

[51] Int. Cl.⁶ .................................................. B62D 25/08
[52] U.S. Cl. ................ 296/196; 296/197; 296/147; 296/146.15; 296/35.3
[58] Field of Search .................... 296/196, 197, 296/216, 220, 147, 146.14, 146.15, 146.16, 35.3

[56] References Cited

U.S. PATENT DOCUMENTS

| | | | |
|---|---|---|---|
| 4,079,986 | 3/1978 | Redford | 296/35.3 X |
| 4,799,726 | 1/1989 | Scott. | |
| 4,842,326 | 6/1989 | DiVito | 296/196 |

FOREIGN PATENT DOCUMENTS

| | | |
|---|---|---|
| A2471307 | 6/1981 | France. |
| 2597822 | 10/1987 | France. |
| 3210970a1 | 10/1982 | Germany. |
| 8717074 U | 7/1988 | Germany. |
| 8810178 U | 12/1988 | Germany. |
| 56-53967 | 5/1981 | Japan. |
| 293225 | 11/1989 | Japan .................... 296/196 |
| 261727 | 5/1990 | Japan. |
| 2197418 | 8/1990 | Japan. |
| 460717 | 5/1992 | Japan. |
| 439778 | 9/1992 | Japan. |
| 558267 | 3/1993 | Japan. |
| 7047961 | 10/1996 | Japan. |
| A2184404 | 6/1987 | United Kingdom. |
| WO88/07943A1 | 10/1988 | WIPO. |

OTHER PUBLICATIONS

French Search Report, Jun. 9, 1995, France.
Great Britain Search Report, May 16, 1995, Great Britain.

*Primary Examiner*—Joseph D. Pape
*Attorney, Agent, or Firm*—Evenson, McKeown, Edwards & Lenahan, PLLC

[57] ABSTRACT

An off-road vehicle having a two-part roof structure. A hard top like roof construction in a rear roof region is constructed so as to be readily manually dismantled into individual support parts and insert parts. The insert parts include a lamellar roof part for a roof region, a lowerable rear window for a rear region, and removable side windows for the two side regions, which can be stowed in the off-road vehicle.

26 Claims, 6 Drawing Sheets

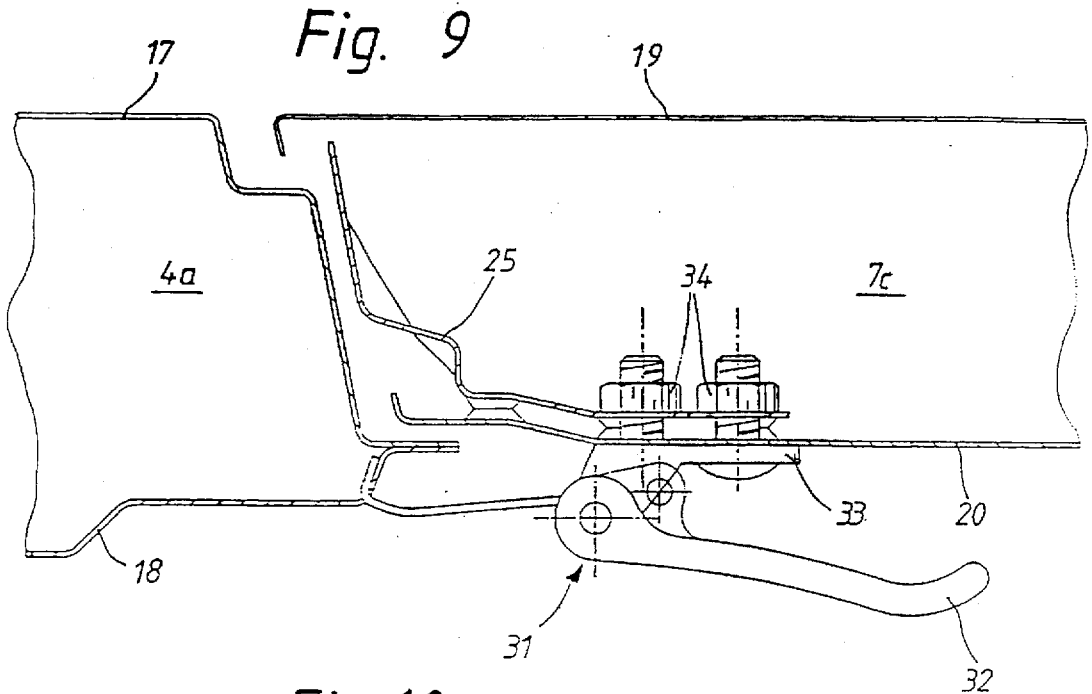
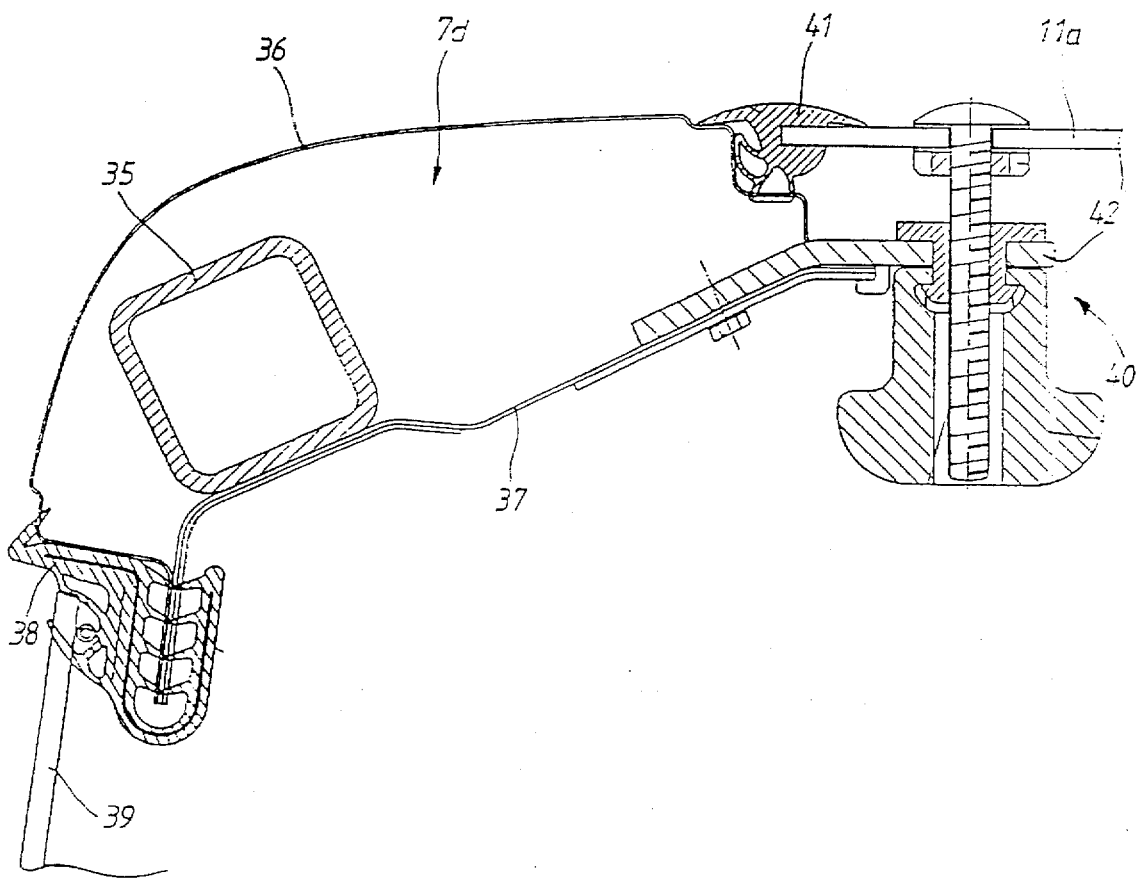

OFF-ROAD VEHICLE HAVING A TWO-PART ROOF STRUCTURE

BACKGROUND AND SUMMARY OF THE INVENTION

The invention relates to an off-road vehicle having a two-part roof structure, a front roof part exhibiting a rollover bar which is integrated into the supporting structure of the off-road vehicle, and a rear roof part being designed as a rigid, hard-top-like roof construction which adjoins the rollover bar.

Such an off-road vehicle is known from German Utility Model 87 17 074. The off-road vehicle exhibits a front roof part which extends rearwards from a windscreen to a rollover bar. The front roof part is provided with a roof cutout in which a steplessly adjustable open-out cover is arranged. Adjoining the rollover bar to the rear as a rear roof part is a removable hard top which is provided with a rear window which can be swung upwards. If the hard top is removed, then the entire rear region of the off-road vehicle is open.

German Utility Model 88 10 178 also discloses an off-road vehicle, of which the rear region is provided with a two-part folding top. Provided in the rear region of the off-road vehicle is a carrying frame which is connected to the supporting structure and divides the folding top into two parts. In the rear region of the off-road vehicle, the folding top can thus be opened optionally in front of or behind the carrying frame. The carrying frame also remains in place when the folding-top parts are open to the full extent.

An object of the invention is to provide an off-road vehicle, of the type mentioned in the introduction, which ensures simple adaptation of the roof structure to various application purposes.

This object is achieved in that the hard-top-like roof construction exhibits a plurality of frame parts which can be connected to a supporting frame for the roof construction and can be joined onto the supporting structure of the off-road vehicle by releasable fastening means, and in that the open, planar regions between the frame parts can be closed off by insert parts which can be connected releasably to the frame parts. It is thus possible to mount and remove the rear roof part in a simple manner. In this arrangement, the hard-top-like roof construction can be dismantled into its individual parts, with the result that there is no bulky all-in-one structural part which requires a large amount of space for storage. By virtue of the exchangeability of the insert parts, different insert parts may be provided depending on the application purpose. As an insert part in the roof region, use may be made, for example, of a solid roof, a folding roof, an open-out roof, a glass roof, a lamellar roof or the like. The supporting frame alone without insert parts may also be provided, which supporting frame, while providing sufficient safety, nevertheless gives the rear-seat occupants the sensation of being driven in the open air.

In one configuration of the invention, the individual frame parts can be connected to one another by means of releasable connecting elements. Dismantling and assembly of the supporting frame for the roof construction are consequently further improved.

In a further configuration of the invention, sealing elements for a sealed connection of the frame parts onto the supporting structure of the off-road vehicle are provided. This ensures that the rear roof part is protected against wetness and moisture when it is closed.

In a further configuration of the invention, peripheral seals are provided between each insert part and the corresponding frame parts for a sealed connection of the insert parts to the supporting frame. Sealing against wetness and moisture is consequently further improved.

In a further configuration of the invention a lowerable rear window is provided as an insert part in the rear region. In a further configuration, the rear window can be lowered in a rear door. Consequently, either the entire rear door or merely the rear window can be opened.

In a further configuration of the invention, a lamellar roof is provided as roof insert part. The lamellar roof can be easily opened and closed, as a result of which the possible applications of the off-road vehicle can be changed with little effort.

Other objects, advantages and novel features of the present invention will become apparent from the following detailed description of the invention when considered in conjunction with the accompanying drawings.

BRIEF DESCRIPTION OF THE DRAWINGS

FIG. 9 shows a further embodiment of the attachment of the lateral frame part onto the rollover bar, having a bracing-lever closure;

FIG. 10 shows a cross-section through a lateral frame part on the rear of the off-road vehicle, in which the attachment of the side window and of the rear window is represented;

DETAILED DESCRIPTION OF THE DRAWINGS

Figure 1:
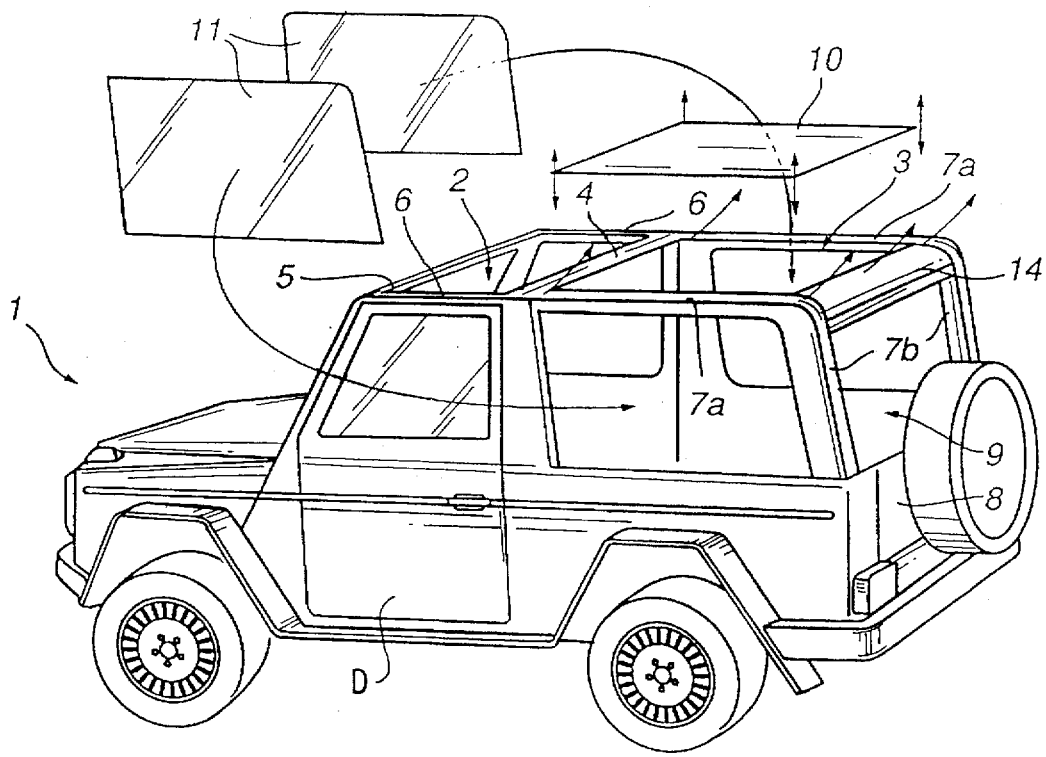
FIG. 1 is a perspective representation of one embodiment of an off-road vehicle according to the invention, of which the hard-top-like roof construction in the rear region of the roof structure can be fully removed and dismantled.
Figure 2:
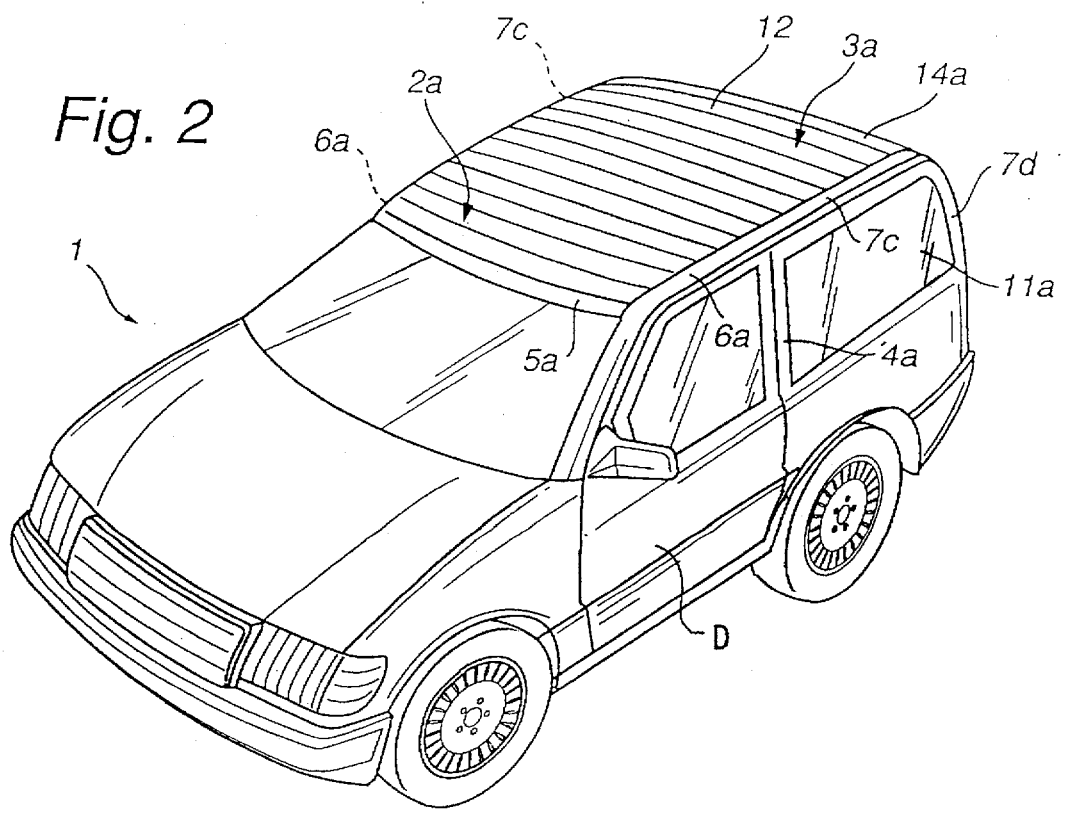
FIG. 2 is a perspective representation of a further embodiment of an off-road vehicle according to the invention, having a fully closed roof structure.
Figure 3:
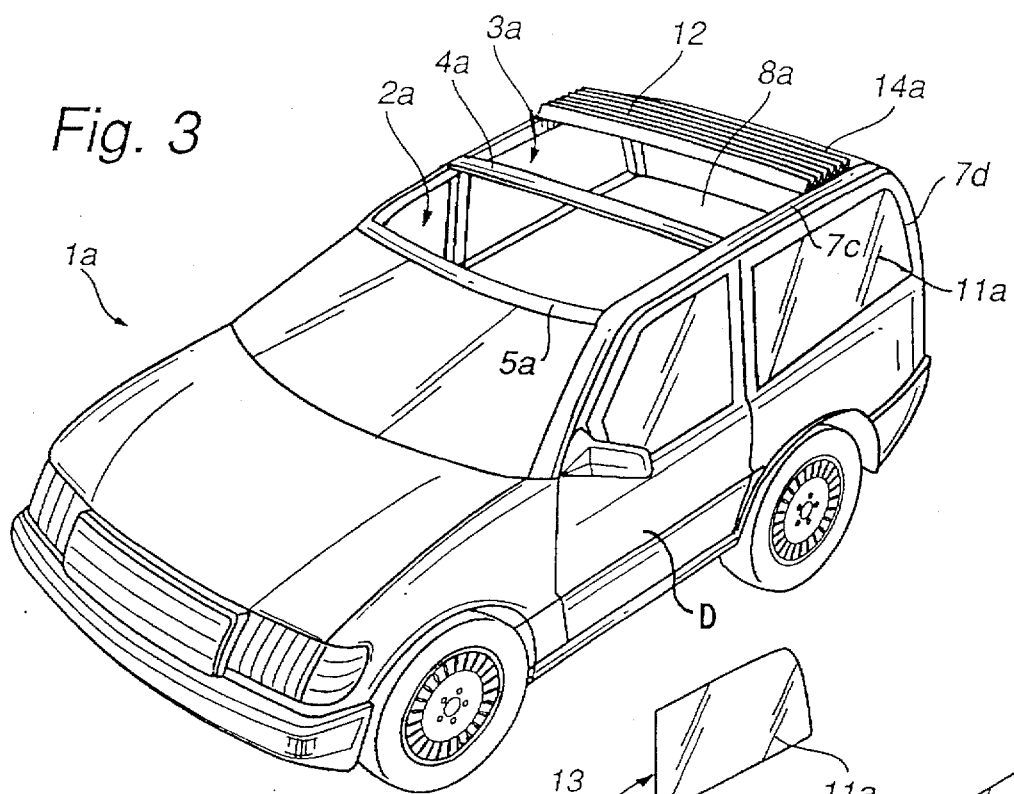
FIG. 3 is a representation similar to FIG. 2, in which a lamellar roof of the roof structure is represented in the open position.
Figure 4:
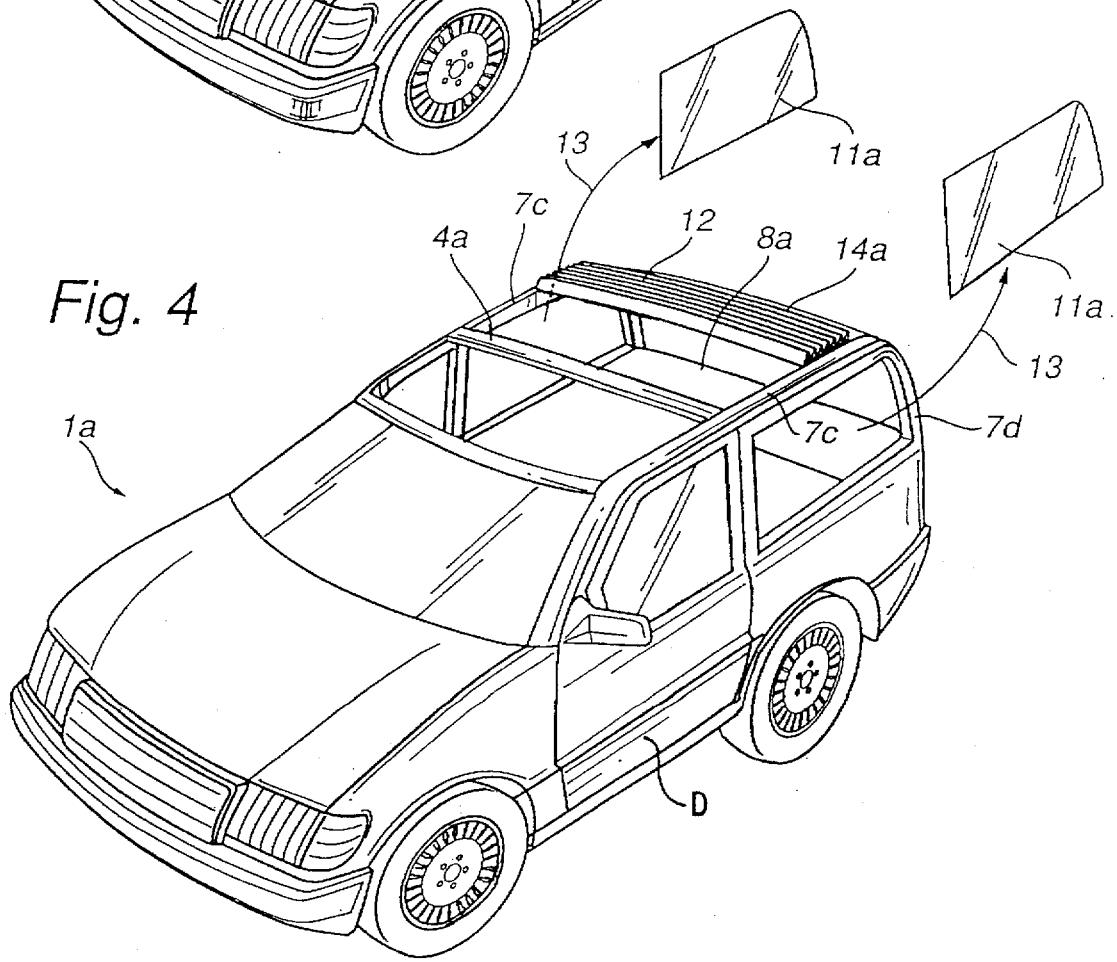
FIG. 4 shows the embodiment according to FIG. 3, in which, additionally, the two side windows in the rear region of the roof structure have been removed.
Figure 5:
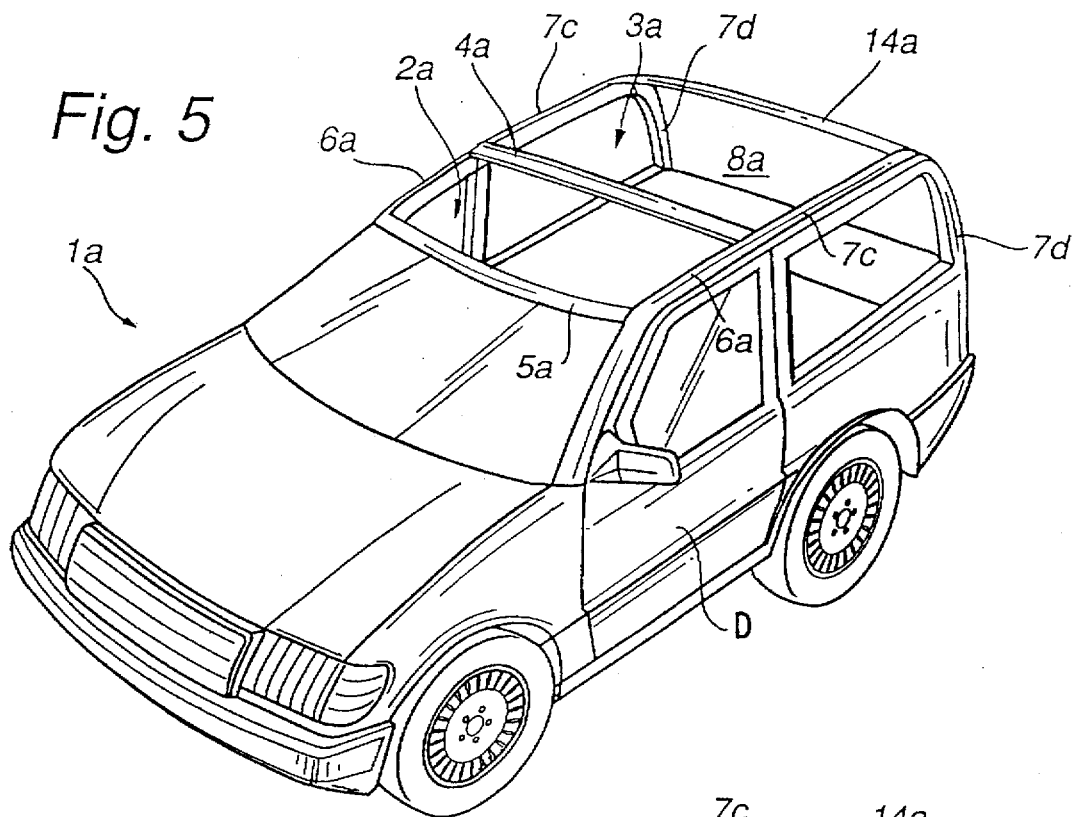
FIG. 5 shows the embodiment according to FIGS. 2 to 4, in which, in the region of the rear roof part, merely a rigid supporting frame is provided.
Figure 6:
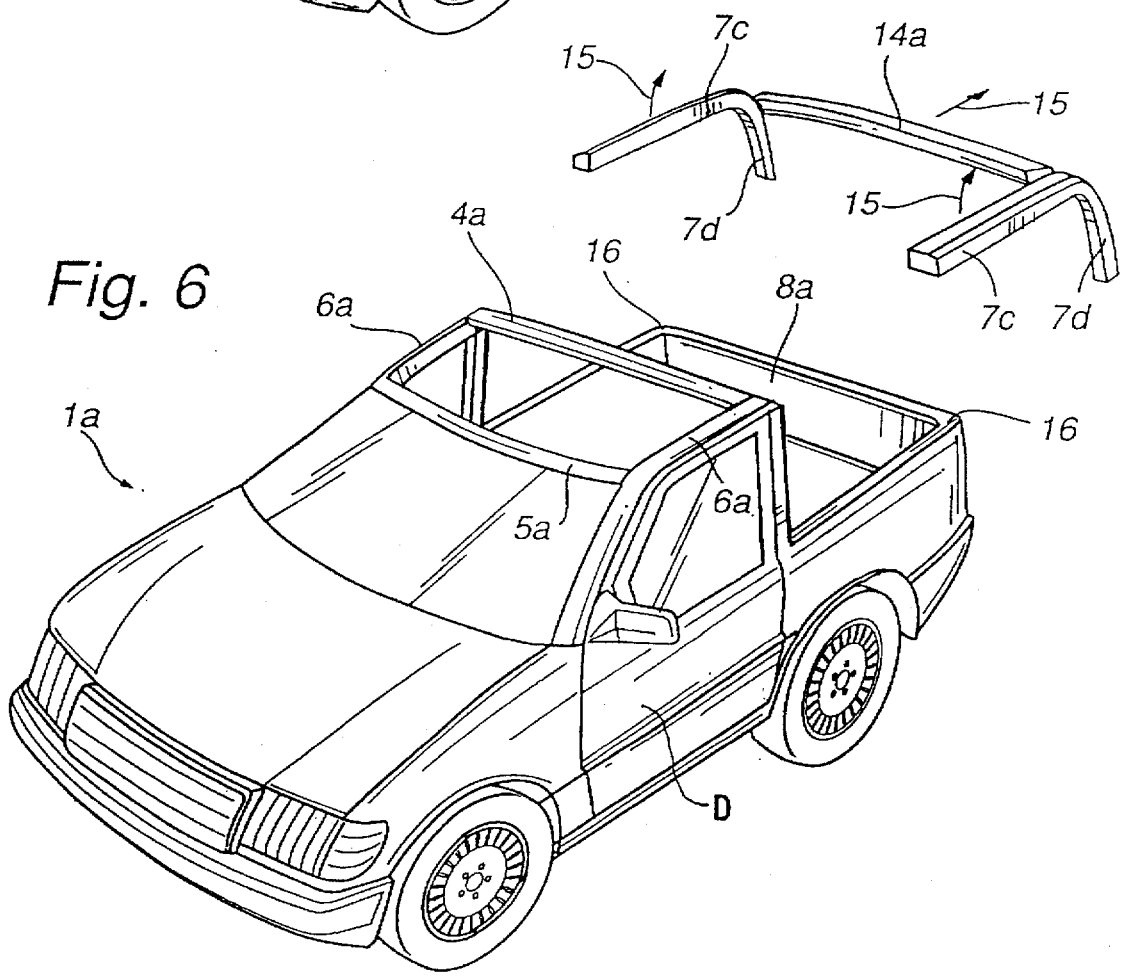
FIG. 6 shows the embodiment according to FIG. 5, in which the rigid supporting frame has been dismantled into three individual frame parts and removed.

An off-road vehicle (1) according to FIG. 1 exhibits two side doors in the region of the driver's seat and passenger seat, of which the upper door frame butts against a stable, lateral roof frame (6). The two lateral roof frames (6) are part of a rigid supporting structure of the off-road vehicle (1). Adjoining the lateral roof frames (6) to the front is a windscreen frame (5) which is likewise integrated into the supporting structure of the off-road vehicle (19). Adjoining the lateral roof frames (6) to the rear, just behind the front seats serving as driver's seat and passenger seat, is a stable rollover bar (4), of which the lateral legs adjoin the rear edge of the side doors and are connected to the supporting structure of the off-road vehicle (1). The windscreen frame (5), the lateral roof frames (6) and the rollover bar (4) provide a stable roof frame above the front seat, in a front roof part (2), which ensures a sufficient degree of safety for the occupants even in the event of the off-road vehicle (1) overturning. A removable roof can be positioned on the said roof frame in a manner known per se.

A rear area provided with removable rear seats begins behind the front seats. Depending on requirements, the rear area thus serves fully as a loading area or as a passenger compartment. Provided in the region of a rear end (9) of the off-road vehicle. (1) is a rear door (8) which extends virtually over the entire width of the off-road vehicle (1). In the region of the rear area, the bodywork of the off-road vehicle (1) forms a frame which bounds the rear area at the outer edges and, approximately in extension of the front mudguard of the off-road vehicle (1), is cut off all the way around, with the result that the rear area is open towards the top. This region can be closed off by a rear roof part (3) in the form of a hard-top-like stable roof construction. The roof construction according to FIG. 1 exhibits three stable frame parts (7a, 7b; 14) which form a supporting frame for the roof construction. Adjoining the rollover bar (4) on both sides towards the rear is in each case one lateral frame part (7a) which extends rearwards approximately horizontally in extension of the lateral roof frames (6).

Integral with the frame part (7a), on each side, is a frame part (7b) which adjoins the frame part (7a) approximately at right angles and projects down approximately vertically in the rear region to form a lateral rear pillar of the supporting structure of the off-road vehicle (1). The two frame parts (7a, 7b) thus form in each case a common frame part (7a, 7b) on each side. The two lateral frame parts (7a, 7b) are connected to one another in the rear region by a frame part (14) which extends transversely over the width of the vehicle. The two L-shaped frame parts (7a, 7b) and the frame part (14) thus form the supports for the roof construction above the rear area of the off-road vehicle (1).

A side window (11) can be inserted between bodywork and the respective lateral frame part (7a, 7b). Provided for horizontally covering the roof construction is a roof part (10) which can be inserted between the lateral frame parts (7a), the frame part (14) and the rollover bar (4). The free rear region between the lateral frame parts (7b) and the frame part (14) can be closed off by a rear window which can be lowered in the rear door (8). The lateral frame parts (7a, 7b) serving as supports are connected releasably to the supporting structure of the off-road vehicle (1). In this arrangement, the front end side of each frame part (7a) is fastened on the rollover bar (4), and the bottom end side of the frame part (7b), which is integral with the frame part (7a), is fastened on the respective rear pillar of the bodywork of the off-road vehicle (1). The frame part (14) is fastened releasably on the opposite lateral frame parts (7a, 7b). The side windows (11) and the roof part (10) too are retained removably on the supporting frame formed by the frame parts (7a, 7b, 14). The entire hard-top-like roof construction can thus be removed from the off-road vehicle (1) and dismantled into its individual parts, as the various arrows indicate.

The off-road vehicle (1a) according to FIGS. 2 to 6 likewise exhibits a two-part roof structure. The front roof part (2a) exhibits a stable supporting frame which is formed by the windscreen frame (5a), the roll-over bar (4a) and by two lateral roof frames (6a). The two lateral roof frames (6a) are, in this arrangement, part of the door frames of the side doors, but have the same function as the roof frames (6) in the off-road vehicle (1) according to FIG. 1. The rear roof part (3a) too corresponds, in its basic structure, to the roof part (3) according to FIG. 1, the hard-top-like roof construction being formed by two lateral L-shaped supports (7c, 7d) and a support (14a) which connects the two lateral supports (7c, 7d) to one another in a rear region. The off-road vehicle (1a) exhibits a rear part (8a) in which a lowerable rear window is arranged. In the off-road vehicle (1a) too, as has already been the case in the off-road vehicle (1) according to FIG. 1, the side windows (11a) can be removed, this being represented by the arrows (13) in FIG. 4. The lateral supports (7c, 7d) and the support part (14a) can also be removed (arrows (15) in FIG. 6). It is additionally possible, as in the exemplary embodiment according to FIG. 1, for the support frame formed from the lateral support parts (7c, 7d) and the support part (14a) to be dismantled, i.e. the support part (14a) is fastened releasably on the supports (7c, 7d). The lateral support parts (7c, 7d) are fastened releasably on the rollover bar (4a), on the one hand, and, on the other hand, releasably on the respective lateral rear pillar (16).

In order to close off the entire roof structure, the off-road vehicle (1a) exhibits a lamellar roof (12) which extends both over the front roof part (2a) and over the rear roof part (3a). The rollover bar (4a) has a cross-section which is an integral constituent part of the body shell and is reduced by the overall height of the lamellar roof. As a result, the lamellar roof (12) terminates flush with the said roof structure over the entire length of the roof structure. The removable side windows (11a) can be stowed in a securing means in the off-road vehicle (1a) behind the rear seats (not shown). As is also the case in the off-road vehicle (1) according to FIG. 1, the rear part (8a) is configured as a pivotable rear door.

All the support or frame parts of the hard-top-like roof construction for the rear roof part (3, 3a) according to FIGS. 1 to 6 are made by a shell-type construction method. The support part (7c) of the off-road vehicle (1a) according to FIGS. 2 to 6 exhibits, according to FIG. 7, an outer metal plate (19) and an inner metal plate (20). The support part (7c) is attached by means of a screw-connection (21) to the rollover bar (4a) which is likewise made in two shells by means of an outer metal plate (17) and an inner metal plate (18). In order to secure the screw-connection, provision is made for a metal stop plate (25) which is connected to the inner metal plate and in which the screw-connection (21) is retained. In order to seal the support part (7c) with respect to the rollover bar (4a), two sealing profiles (22 and 24) and a rubber stop member (23) are provided. The sealing profile (22) seals the joint between the outer metal plate (19) of the support part (7c) and the outer metal plate (17) of the rollover bar (4a). The sealing profile (24) is arranged between the inner metal plate (20) of the support part (7c) and the connection seam between outer metal plate (17) and inner metal plate (18) of the rollover bar (4a).

Figure 7:
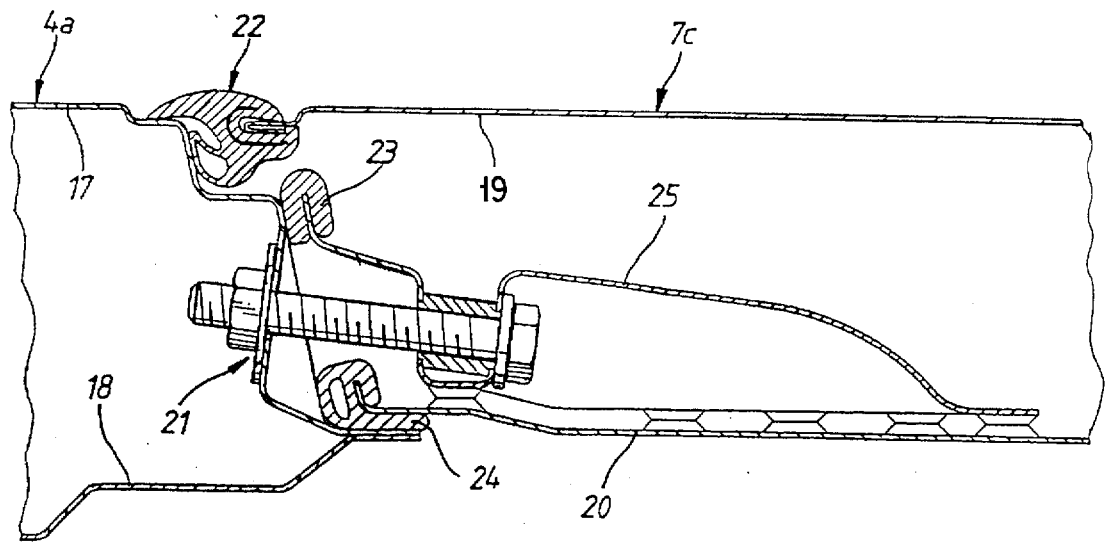
FIG. 7 shows the attachment of a lateral frame part according to FIGS. 5 and 6 onto the rollover bar, which is part of the supporting structure of the off-road vehicle.
Figure 8:
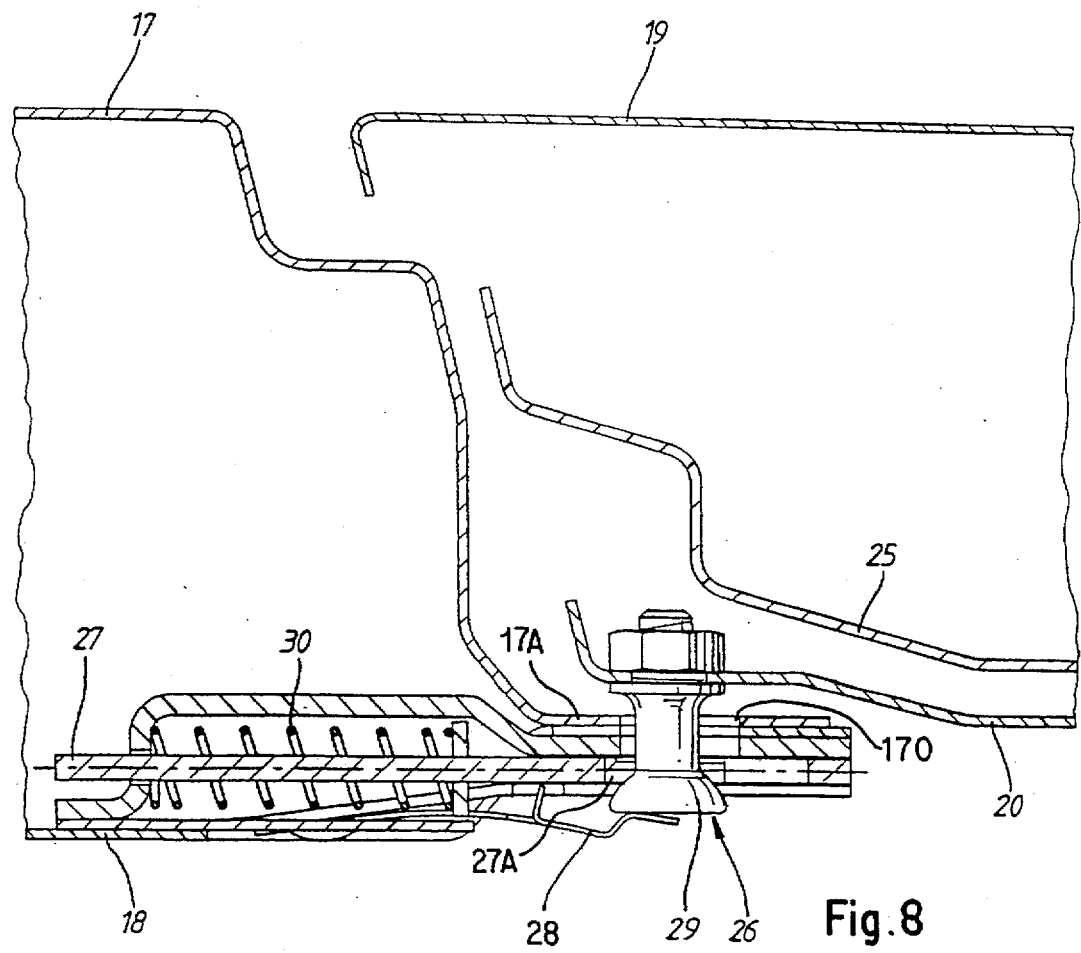
FIG. 8 shows a further embodiment of the attachment of the lateral frame part onto the rollover bar, the attachment exhibiting a securing snap-tight closure.

For reasons of clarity, the sealing profiles are not drawn in the case of the exemplary embodiment according to FIG. 8, but they can be added analogously to the configuration according to FIG. 7. In the case of this exemplary embodiment, the releasable connection between the support part (7c) and the rollover bar (4a) is effected by a snap-tight mechanism (26) described hereinbelow. Said snap-tight mechanism (26) is also similarly suited for the locking of other roof constructions. In particular, the snap-tight mechanism serves to lock a folding top of a cabriolet. In quite general terms, the snap-tight mechanism can also be used for attaching a movable part onto a stationary part.

A mushroom-shaped lock pin (29) projects downwards from the inner metal plate (20) of the support part (7c) and is screwed thereto. Between the outer metal plate (17) and the inner metal plate (18) there is provided, in the bottom region of the profile of the rollover bar (4a), a housing which is fabricated from sheet-metal parts and in which there is arranged a lock slide (27) which is loaded by a spring (30). In the region of connection to the mushroom-shaped lock pin (29), the lock slide (27) exhibits a keyhole-like opening 27A. A continuation of the housing 17A exhibits, in this region, a circular opening 170 for receiving the lock pin. In the opened state of the snap-tight mechanism (26), the lock slide (27) is retained in its rest position by the nose of a leaf spring (28), said leaf spring (28) being mounted in the housing. The circular opening 170 in the housing and the equivalent part of the keyhole-shaped opening 27A in the lock slide (27) coincide in this position. If the lock pin (29) is then introduced into the housing from above, it presses the leaf spring (28) downwards. As soon as the lock pin (29) has been moved downwards to such an extent that its mushroom-shaped head is located beneath the plane of the lock slide (27), the leaf spring (28) releases the lock slide (27), as a result of which it is displaced due to the spring force of the spring (30), with the result that the tapered part of the keyhole-shaped opening 27A of the lock slide (27) is made to coincide with the lock pin (29). Consequently, the lock pin (29) is secured in the lock slide (27), which constitutes a closure element. The position of the support part (7c) on the rollover bar (4a) is fixed. It is also possible to provide said above described fixing merely as an additional securing means over and above the screw-connection according to FIG. 7.

In the case of the configuration according to FIG. 9, a bracing-lever mechanism (31) is provided in order to attach the support part (7c) onto the rollover bar (4a). A bracing lever (32) is mounted pivotably on a base plate (33) which is connected to the inner metal plate (20) and the metal stop plate (25) of the support part (7c) with the aid of screw-connections (34). Slots are provided in the base plate (33), with the result that adjustment of the bracing-lever mechanism is possible. Provided in the region of the inner metal plate (18) of the rollover bar (4a) is a cutout, which results in a projecting sheet-metal lug. The latter acts as a counterpart for the positively locking engagement of a bracing hook of the bracing lever (32). The advantage with this bracing-lever closure (31) is that tools are not required for fastening the support part (7c) on the rollover bar (4a), and that the individual parts of the bracing-lever closure (31) are connected fixedly to the support part (7c) and are thus captive. The bracing-lever closure (31) may optionally be provided with additional securing and/or centering means.

The above described embodiments for the fastening of the support part (7c) on the rollover bar (4a) merely constitute selected examples. The invention also contemplates other types of releasable fastening mechanisms.

The releasable fastening of the side window (11a) in the region of the lateral support part (7d) terminating in the rear pillar (16) is represented in FIG. 10 merely by way of example. The drawing represents a cross-section in a horizontal plane through the support part (7d). The two-shell support part (7d) exhibits an outer shell (36) and an inner shell (37), a stable carrying tube (35) being assigned to the inner shell (37). The carrying tube (35), on the one hand, simplifies the integration of the support part (7d) into the rear pillar of the body shell and, on the other hand, contributes to the reinforcement of the support part (7d). The side window (11a), which butts against the outer shell (36) of the support part (7d) by means of a sealing profile (41), is retained, such that it can be steplessly opened out, on the support part (7d) by means of a retaining device (40). By means of retaining device (40), the side window (11a) is further fastened releasably on the support part (7d). Screwed to the inner shell (37) is a base plate (42) in which there is provided a bore for the plugging-through of a threaded clip. A hand-operated knob is attached on the threaded clip from the inside, retaining noses of the hand-operated knob engaging in a positively locking manner behind corresponding expansion noses integrally formed on the threaded clip. In the region of connection to the expansion noses of tile threaded clip, the hand-operated knob exhibits a ribbed arrangement, with the result that, in the event of a rotation of the hand-operated knob, the threaded clip is carried along in the circumferential direction. A torque can thus be transferred to the threaded clip by means of the hand-operated knob. Projecting into the threaded clip is a plastic screw which is fastened on the side window (11a). The plastic screw is pushed, from an outer side, through a bore in the side window (11a) and butts, by means of its head, against the outer side of the side window (11a). The plastic screw is secured on the side window (11a) by a counter-nut fitted from the inside. In order to ensure a sealed attachment of the lowerable, frameless rear window (39) onto the support part (7d), a sealing profile (38) is provided between the edge of the rear window (39) and the outer shell (36) of the support part (7d).

Figure 11:
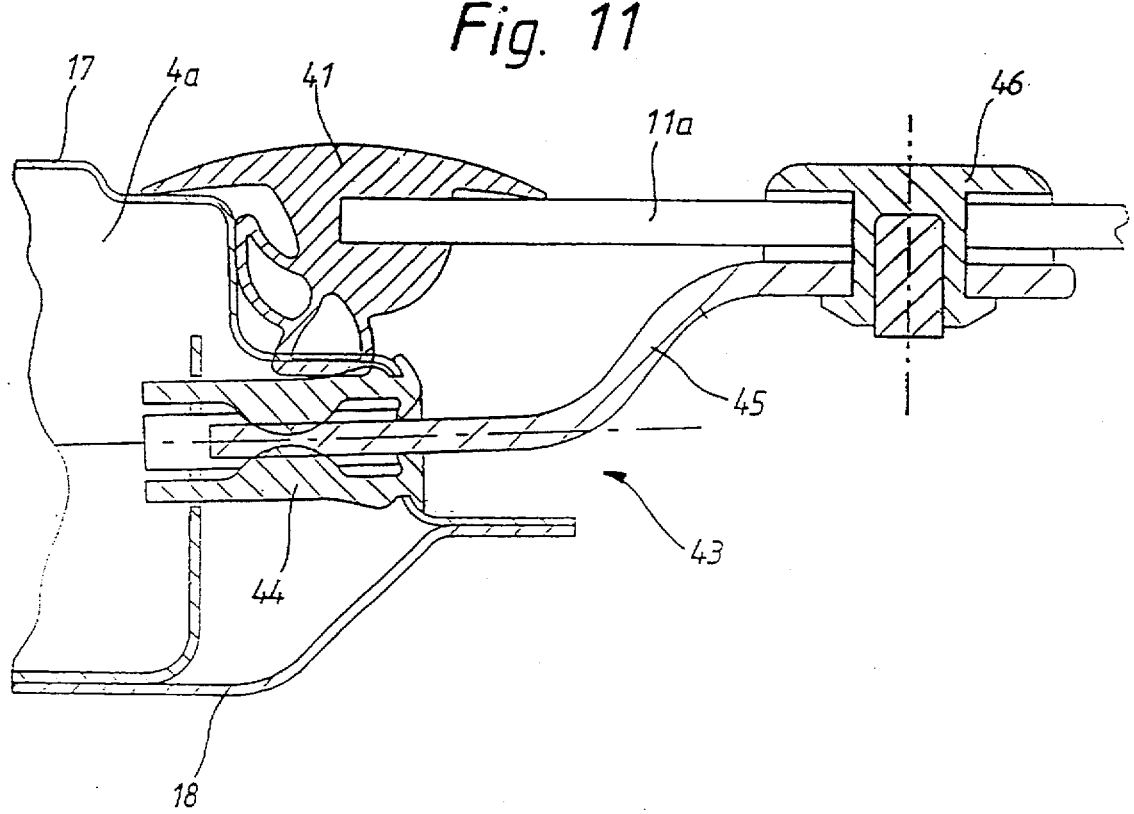
FIG. 11 shows a cross-section similar to FIG. 10, in which the connection of the side window according to FIG. 10 to the rollover bar is represented.

FIG. 11 shows the fastening, corresponding to the configuration according to FIG. 10, of the side window (11a) in the region of the lateral wall of the rollover bar (4a). Since the side window (11a) can be opened out in its rear region (FIG. 10), the front region of the side window (11a) has to be retained pivotably in hinges in certain regions. For this purpose, the side window (11a) exhibits two S-shaped hinge plates (45) which are arranged at a distance one above the other, merely one hinge arrangement (43) being represented in FIG. 11. The corresponding bottom or top hinge arrangement (43) is configured in the same manner. The hinge plate (45) is fastened on the side window (11a) by means of a dowel clip (46). A hinge sleeve (44) is inserted into the outer shell (17) of the rollover bar (4a), which hinge sleeve is supported, in an inner region, on a retaining angle which is connected fixedly to the inner shell (18) of the rollover bar (4a). Upon inserting the hinge plate (45) into the hinge sleeve (44), the latter is expanded, as a result of which it clamps fixedly in the sheet metal of the outer shell (17). The seal (41) runs around the edges of the side window (11a) and thus also seals the joint between the side window (11a) and the outer shell (17) of tile roll-over bar (4a).

Figure 12:
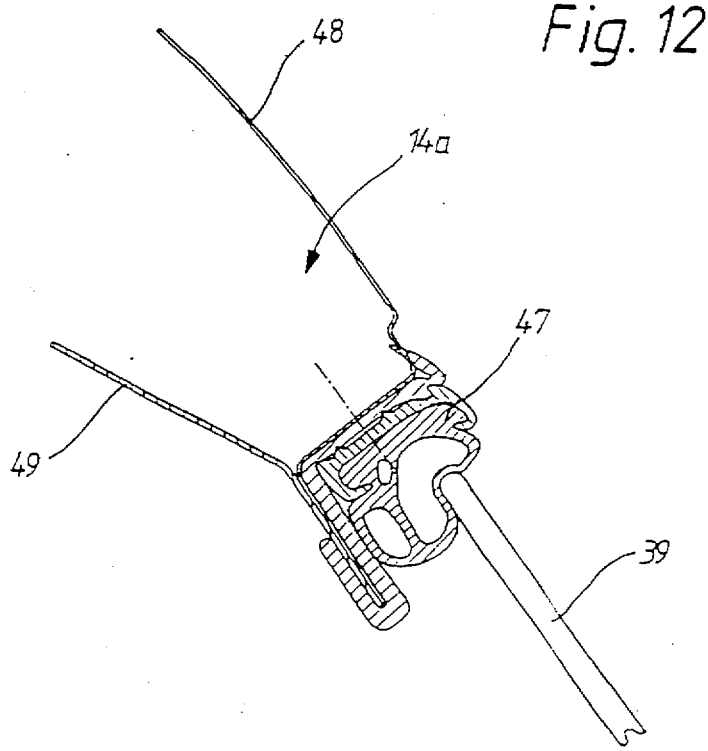
FIG. 12 shows the sealing of the rear window on a frame part running transversely along the upper side of the rear end.

In order to seal the frameless rear window (39) in the region of its top edge, securely on the transverse support (14a), provision is made for a sealing profile (47) which, with the aid of an aluminum profile, is retained on the inner shell (49) and the outer shell (48) of the two-shell transverse support (14a) (see FIG. 12). In the region adjoining the top edge of the rear window (39), the sealing profile (47) exhibits a hollow profile which is adapted to the form of the edge of the rear window (39). Consequently, in particular even when the off-road vehicle is being driven, uniform sealing is always achieved in spite of the flow conditions present.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof structure for an off-road vehicle which includes vehicle supporting structure, comprising:
- a front roof part including a rollover bar integrated into the vehicle supporting structure,
- a rear roof part of rigid construction which in use adjoins the rollover bar and includes at least two rear roof frame parts forming a supporting frame which is releasably fastenable to the vehicle supporting structure by releasable fasteners, and
- removable side windows, insertable behind the rollover bar and connectable with respective ones of said rear roof frame parts by releasable connectors.

2. Roof structure for an off-road vehicle which includes vehicle supporting structure, comprising:
- a front roof part including a rollover bar integrated into the vehicle supporting structure,
- a rear roof part of rigid construction which in use adjoins the rollover bar and includes at least two rear roof frame parts forming a supporting frame which is releasably fastenable to the vehicle supporting structure by releasable fasteners, and
- removable side windows, insertable behind the rollover bar and connectable with respective ones of said rear roof frame parts by releasable connectors,
- wherein said rear roof frame parts include a pair of side frame members which in use extend rearwardly from fastening points at said rollover bar along lateral sides of said vehicle.

3. Roof structure according to claim 2, wherein selectively insertable lamellar roof parts are supportable at said side frame members to form a closed rear roof section between said side frame members.

4. Roof structure according to claim 2, wherein said rear roof frame parts include a rear transverse frame member which in use connects said side frame members together at respective rearward ends of said side frame members.

5. Roof structure according to claim 4, wherein said rear transverse frame member supports a seal which in use is engaged by a lowerable rear window.

6. Roof structure according to claims 3, wherein said rear roof frame parts include a rear transverse frame member which in use connects said side frame members together at respective rearward ends of said side frame members.

7. Roof structure according to claim 6, wherein said rear transverse frame member supports a seal which in use is engaged by a lowerable rear window.

8. Roof structure according to claim 2, wherein said side frame members are L-shaped members with respective downwardly extending legs which in use are supported at a rear end region of the vehicle supporting structure.

9. Roof structure according to claim 8, wherein said removable side windows are bordered on top and in the rear by said side frame members.

10. Roof structure according to claim 9, wherein selectively insertable lamellar roof parts are supportable at said side frame members to form a closed rear roof section between said side members.

11. Roof structure according to claim 10, wherein said rear roof frame parts include a rear transverse frame member which in use connects said side frame members together at respective rearward ends of said side frame members.

12. Roof structure according to claim 11, wherein said rear transverse frame member supports a seal which in use is engaged by a lowerable rear window.

13. Roof structure according to claim 9, wherein respective downwardly extending lateral portions of said rollover bar form respective forward borders for said removable side windows.

14. Roof structure according to claim 2, wherein said releasable fasteners are operable to releasably fasten forward ends of said side frame members to said rollover bar.

15. Roof structure according to claim 14, comprising seal members disposed between said side frame members and said rollover bar to form a sealed connection when said side frame members are fastened to the rollover bar.

16. Roof structure according to claim 14, wherein said releasable fasteners include respective spring loaded snap-tight closure assemblies.

17. Roof structure according to claim 16, wherein each of said snap-tight closure assemblies includes a pin carried by one of said side frame members and a spring loaded slide with an opening for said pin carried by said rollover bar.

18. Roof structure according to claim 17, comprising seal members disposed between said side frame members and said rollover bar to form a sealed connection when said side frame members are fastened to the rollover bar.

19. Roof structure according to claim 14, wherein said releasable fasteners include threaded members for threadably clamping the side frame members to the rollover bar.

20. Roof structure according to claim 19, comprising seal members disposed between said side frame members and said rollover bar to form a sealed connection when said side frame members are fastened to the rollover bar.

21. Roof structure according to claim 19, wherein said threaded members include bolts carried by said side frame members which are insertable longitudinally of the vehicle into openings in said rollover bar, threaded nuts being threadably engageable with said bolts to clamp the side frame members to the rollover bar.

22. Roof structure according to claim 1, wherein peripheral seals are provided on said rear frame parts for sealing the rear frame parts and the side windows when said side windows are in an installed closed condition.

23. Roof structure according to claim 3, wherein peripheral seals are provided on said rear frame parts for sealing the rear frame parts and the side windows when said side windows are in an installed closed condition.

24. Roof structure according to claim 5, wherein peripheral seals are provided on said rear frame parts for sealing the rear frame parts and the side windows when said side windows are in an installed closed condition.

25. Roof structure according to claim 9, wherein peripheral seals are provided on said rear frame parts for sealing the rear frame parts and the side windows when said side windows are in an installed closed condition.

26. Roof structure according to claim 14, wherein peripheral seals are provided on said rear frame parts for sealing the rear frame parts and the side windows when said side windows are in an installed closed condition.

* * * * *